US009048708B2

(12) United States Patent  
Cloran et al.

(10) Patent No.: US 9,048,708 B2  
(45) Date of Patent: Jun. 2, 2015

(54) INTEGRATED DRIVE-MOTOR ASSEMBLY WITH IP SEAL AND ENHANCED HEAT TRANSFER

(71) Applicants: Shawn D. Cloran, Wauwatosa, WI (US); Zoran Vrankovic, Greenfield, WI (US); Corey J. Risty, St. Paul, MN (US)

(72) Inventors: Shawn D. Cloran, Wauwatosa, WI (US); Zoran Vrankovic, Greenfield, WI (US); Corey J. Risty, St. Paul, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 356 days.

(21) Appl. No.: 13/668,833

(22) Filed: Nov. 5, 2012

(65) Prior Publication Data

US 2014/0125161 A1    May 8, 2014

(51) Int. Cl.
| | | |
|---|---|---|
| H02K 5/10 | (2006.01) | |
| H02K 9/22 | (2006.01) | |
| H02K 5/12 | (2006.01) | |
| H02K 5/22 | (2006.01) | |
| H02K 11/00 | (2006.01) | |

(52) U.S. Cl.
CPC .. *H02K 9/22* (2013.01); *H02K 5/10* (2013.01); *H02K 5/12* (2013.01); *H02K 5/225* (2013.01); *H02K 11/0073* (2013.01)

(58) Field of Classification Search
CPC ............. H02K 5/06; H02K 5/10; H02K 5/12; H02K 9/22; H02K 11/0073
USPC ...................... 310/52, 67 R, 68 R, 88, 89, 418
IPC ........................................ H02K 5/10, 5/12, 9/22
See application file for complete search history.

(56) References Cited

U.S. PATENT DOCUMENTS

| | | | | |
|---|---|---|---|---|
| 6,107,716 | A * | 8/2000 | Penketh .......................... 310/89 |
| 6,201,365 | B1 * | 3/2001 | Hara et al. .................... 318/558 |
| 6,392,322 | B1 * | 5/2002 | Mares et al. .................... 310/88 |
| 7,207,187 | B2 * | 4/2007 | Funahashi et al. ........... 62/228.4 |
| 8,007,255 | B2 * | 8/2011 | Hattori et al. ............... 417/410.1 |
| 8,097,992 | B2 * | 1/2012 | Toyama et al. ................. 310/64 |
| 8,278,790 | B2 * | 10/2012 | Rueggen et al. ............ 310/68 D |
| 8,764,415 | B2 * | 7/2014 | Hattori et al. ............... 417/410.1 |
| 8,829,839 | B1 * | 9/2014 | Vrankovic et al. ........... 318/472 |
| 2003/0200761 | A1 * | 10/2003 | Funahashi et al. ........... 62/228.4 |
| 2005/0167183 | A1 * | 8/2005 | Tominaga et al. ............. 180/444 |
| 2005/0223727 | A1 * | 10/2005 | Funahashi et al. ........... 62/228.4 |

(Continued)

OTHER PUBLICATIONS

"Rexroth IndraDrive MI, The ultra-compact drive system", Rexroth Bosch Group, published 2007.

(Continued)

*Primary Examiner* — John K Kim  
(74) *Attorney, Agent, or Firm* — Fay Sharpe LLP

(57) ABSTRACT

An electronics drive module is connected to the flange of a drive motor assembly. The module includes: a metal frame including a peripheral wall; and a metal floor. A power supply PCBA is located adjacent the upper surface of the metal floor, and a switching chip assembly is located adjacent the lower surface of the floor. The base plate of the switching chip assembly conducts heat into the floor and conducts heat into the mounting flange. An environmental seal is located between the lower edge of the frame and the sealing surface of the mounting flange and extending coextensively with the lower edge of the peripheral wall such that a sealing zone is defined within the peripheral wall of the frame and the first and second thermal interfaces are located within the sealing zone.

12 Claims, 5 Drawing Sheets

(56) References Cited

U.S. PATENT DOCUMENTS

| | | | |
|---|---|---|---|
| 2006/0064998 A1* | 3/2006 | Funahashi et al. | 62/228.4 |
| 2014/0125161 A1* | 5/2014 | Cloran et al. | 310/52 |
| 2014/0125174 A1* | 5/2014 | Quade et al. | 310/89 |
| 2014/0320048 A1* | 10/2014 | Vrankovic et al. | 318/400.25 |

OTHER PUBLICATIONS

Elau PacDrive™ iSH, "Intelligent Servo Module", published 2006 (estimated).

* cited by examiner

INTEGRATED DRIVE-MOTOR ASSEMBLY WITH IP SEAL AND ENHANCED HEAT TRANSFER

BACKGROUND

Integrated drive-motor (IDM) assemblies are generally known. In such systems, the motor drive electronics module is physically connected directly to the electric motor itself to provide a single integrated drive-motor assembly in a compact package with associated space savings and machine control system simplification. One example is a servo drive and an associated servo motor.

One drawback associated with known IDM assemblies is the heat generated within the drive module can require the performance of the drive to be limited in order not to exceed the maximum temperature limitation. In particular, a switching chip set (sometimes referred to as the "DBC" for its use of direct bonding copper substrate technology) includes IGBT or like switches that generate large amounts of heat. The power supply printed circuit board assembly (PCBA) also generates heat. In conventional IDM systems, heat is conducted between the DBC and PCBA by direct contact or the close proximity of these components with each other, and the drive performance can sometimes be limited in order to reduce the heat below the drive's maximum temperature limitation.

IDM assemblies are often used in environments that expose the IDM assembly to harsh environmental conditions such as cleaning fluids, dust, oils, and other contaminants. Known systems have provided environmental sealing such as IP or NEMA for the electronic drive circuitry, but these known IDM systems have not provided IP or NEMA class environmental protection for the overall interface between the drive and the motor, including the heat sinks and other heat transfer pathways and thermal interfaces. As such, over time, thermal interfaces in these known devices can be contaminated and degrade leading to even less efficient cooling and further decreased performance. For example, thermal transfer materials such as thermal transfer grease, paste, adhesives, pads, can degrade and/or be displaced over time due to environmental contamination in known IDM assemblies.

SUMMARY OF THE PRESENT DEVELOPMENT

In accordance with a first aspect of the present development, an integrated drive motor assembly comprises a motor comprising a motor housing and a motor unit located in the motor housing, said motor housing comprising a mounting flange including a sealing surface and a peripheral edge. An electronics drive module is connected to the mounting flange of the motor housing, the electronics drive module comprising: (i) a metal frame including a peripheral wall that defines a central opening and that includes an upper edge and a lower edge; and (ii) a metal floor connected to said peripheral wall and extending across the central opening, the floor comprising an upper surface and a lower surface. A power supply PCBA is located adjacent said upper surface of said floor, and a switching chip assembly is located adjacent the lower surface of the floor. The switching chip assembly includes a base plate and a plurality of switches connected to the base plate. The base plate is thermally associated at a first thermal interface to said lower surface of said floor and conducts heat into said floor and is thermally associated at a second thermal interface to the mounting flange of the motor housing and conducts heat into the mounting flange. Heat conducted to the floor by the base plate is conducted to the peripheral wall of the frame and heat conducted to the mounting flange from the base plate is conducted to the motor housing. The lower edge of the metal frame is sealingly engaged with the sealing surface of the motor housing mounting flange. The integrated drive motor assembly further includes an environmental seal located between the lower edge of the frame and the sealing surface of the mounting flange and extending coextensively with the lower edge of the peripheral wall of the frame such that a sealing zone is defined within the peripheral wall of the frame and the first and second thermal interfaces are located within the sealing zone.

In accordance with another aspect of the present development, a method for cooling an integrated motor drive assembly includes connecting an electronics drive module to a metallic mounting flange of a metallic motor housing. The electronics drive module comprises: (i) a metal frame comprising a peripheral wall that defines a central opening and that includes an upper edge and a lower edge; and (ii) a metal floor connected to the peripheral wall and extending across the central opening. The floor includes an upper surface and a lower surface. The method includes conducting heat through a first thermal interface into said floor of said frame from a base plate of a switching chip assembly located adjacent said lower surface of said floor and conducting heat from the base plate through a second thermal interface into the mounting flange of the motor housing. Heat conducted to the floor by the base plate is conducted to the peripheral wall of the frame and heat conducted to the mounting flange from the base plate is conducted to the motor housing. The method further includes providing at least IP66 level ingress protection for the first and second thermal interfaces by including a seal between the lower edge of the metal frame and a sealing surface of the mounting flange such that a sealed zone is defined within the peripheral wall of the frame between the mounting flange and said floor.

DETAILED DESCRIPTION

Figure 1:
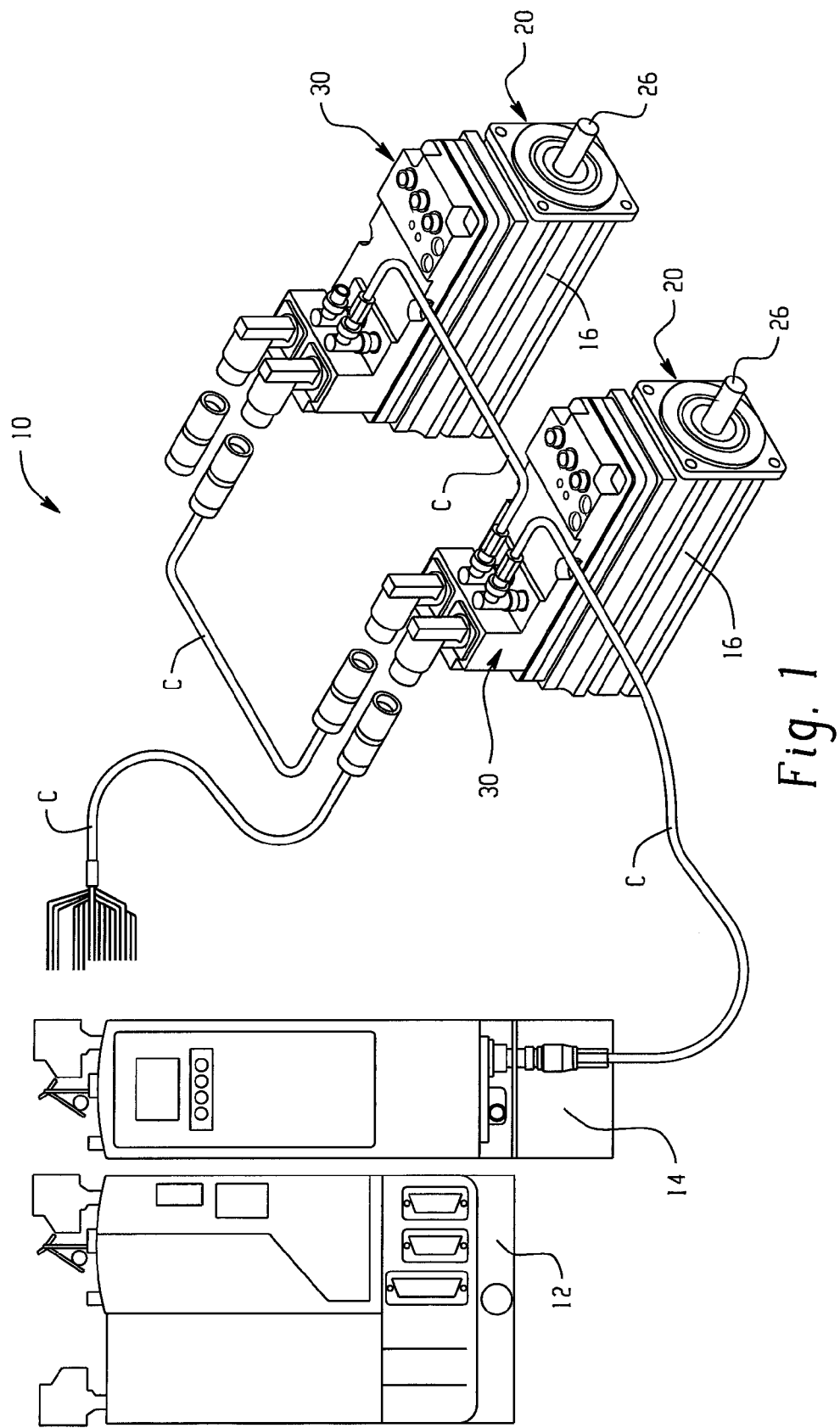
FIG. 1 illustrates an integrated drive-motor system including first and second integrated drive-motor assemblies each formed according to the present development.

FIG. 1 shows an integrated drive-motor system is generally identified by reference numeral 10. The system 10 includes an integrated control module 12, power interface module 14, and a pair of integrated drive-motor assembles 16 each formed in accordance with the present development. Although the illustrated system 10 includes two integrated drive-motor assemblies 16, additional (or a single) integrated drive-motor assemblies can be provided. Each of the integrated drive-motor assemblies 16 is connected via one or more cables C to each other, and to the integrated control module 12 and power interface module 14 for respectively supplying power and control data/signals to the integrated drive-motor assemblies 16 and for providing feedback to the control module 12. The system 10 is illustrative of only one exemplary type of installation of the integrated drive-motor assembly 16 of the present disclosure, and it will be appreciated that the integrated drive-motor assembly can be used in a variety of other applications.

Figure 2:
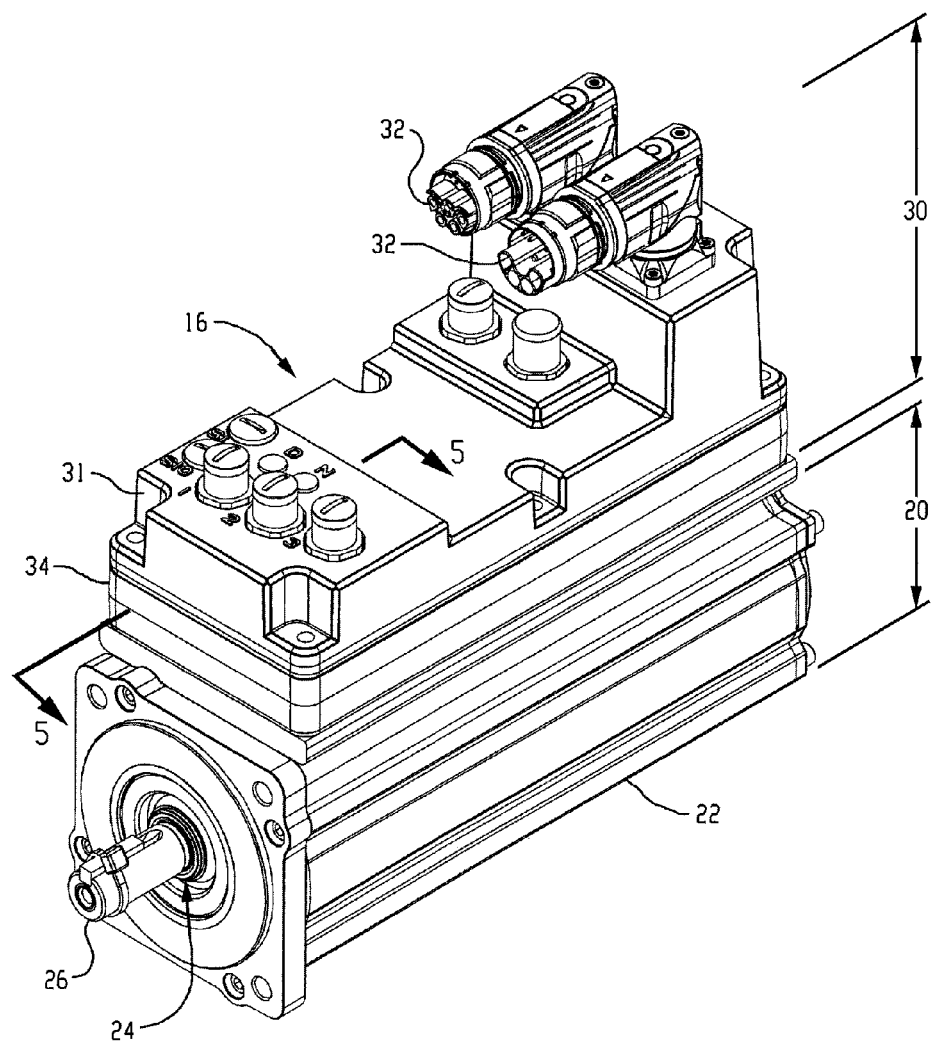
FIG. 2 is an isometric view of an integrated drive motor assembly of FIG. 1.

Turning to FIG. 2, an exemplary integrated drive-motor assembly 16 is illustrated and includes a motor 20 and a drive electronics module or "drive pod" 30 connected to the motor 20. The motor 20 comprises a motor frame or housing 22 that contains an electric motor unit 24 such as a servo motor. The motor unit 24 includes an output shaft 26. The motor housing 22 is defined from metal such as die-cast aluminum or other thermally conductive metal.

As noted, the integrated drive-motor assembly 16 further comprises the drive pod 30 that contains the switching and other required electronics module to drive the motor 24 in a controlled fashion. The drive pod 30 comprises a plurality of electrical connectors 32 for input and output of power and control/feedback signals.

Figure 3:
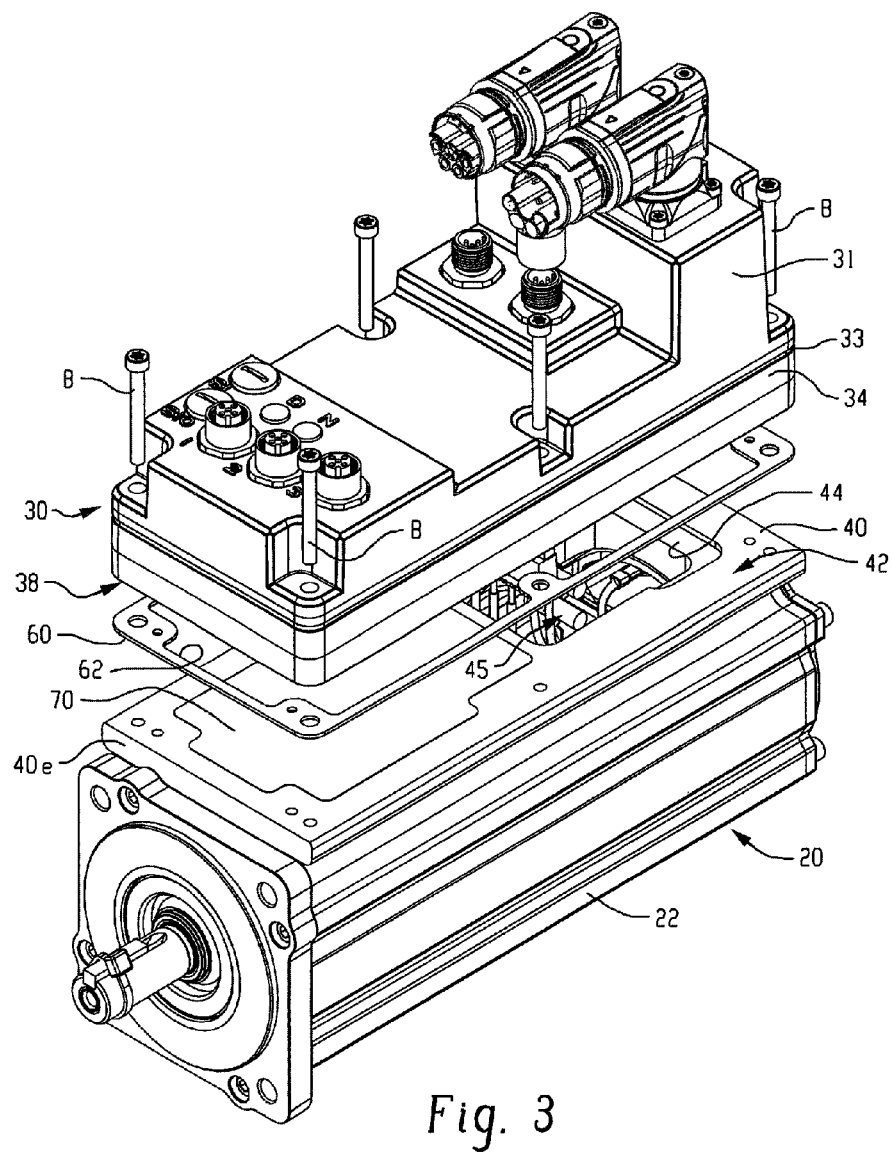
FIG. 3 is an exploded isometric view of the integrated drive motor assembly of FIG. 2, in which the drive electronics module or "drive pod" is separated from the motor.

With additional reference to the exploded view of FIG. 3, it will be appreciated that the drive pod 30 is supported on and connected to an exterior surface or mounting flange 40 of the housing 22. In particular, the mounting flange 40 comprises a continuous, planar sealing surface 42 that surrounds one or more openings 44 that open through the flange 40 into the interior space 45 of the housing 22 in which the motor 24 is located in order to allow for the passage of one or more electrical cables or connectors that electrically connect the motor 24 to the drive pod 30. The sealing surface 42 extends continuously and in an uninterrupted manner about the entire periphery of the mounting flange 40 of the housing 22.

As described in further detail below, the motor housing sealing surface 42 is adapted to mate with a corresponding continuous planar sealing surface 38 on the underside of the drive pod 30, and a continuous gasket or seal 60 is interposed between the motor housing sealing surface 42 and the drive pod sealing surface 38 as described in further detail below. The seal 60 is an elastomeric or other suitable sealing material. When installed, the seal 60 provides at least an IP66 rated seal (e.g., IP66, IP67, etc. or a corresponding NEMA rated seal) and it prevents ingress of contaminants at the interface between the surfaces 42,38 in accordance with published standards for ingress protection. The seal 60 is a one-piece structure that defines an internal open space 62.

A thermally conductive heat transfer material 70, such as a thermal grease or paste and/or a thermal conductivity pad or the like is installed between the drive pod 30 and the motor housing mounting flange 40 to facilitate transfer of heat from the drive pod 30 to the motor housing 22. Unlike conventional integrated drive-motor assemblies, the heat transfer material 70 is fully surrounded by and contained within the space 62 of the seal 60 such that the heat transfer material 70 is shielded from contaminants by the seal 60. Accordingly, the heat transfer material 70 is protected from exposure to contaminants such as dust, moisture and liquids and, thus, shielded from being inadvertently displaced or rendered ineffective over time due to cleaning operations or other exposure to liquid and other contaminants.

Figure 4:
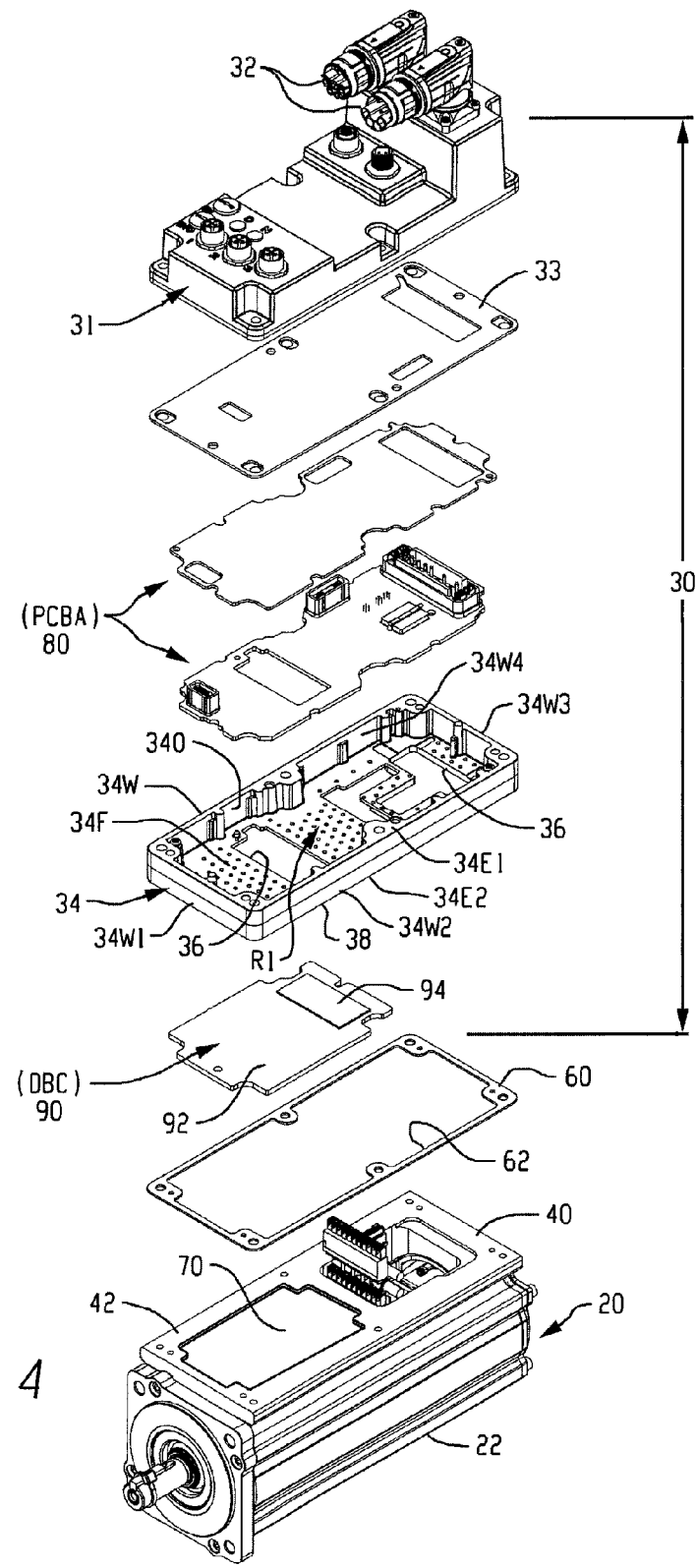
FIG. 4 is similar to FIG. 3, but also provides an exploded view of the drive pod itself.
Figure 5:
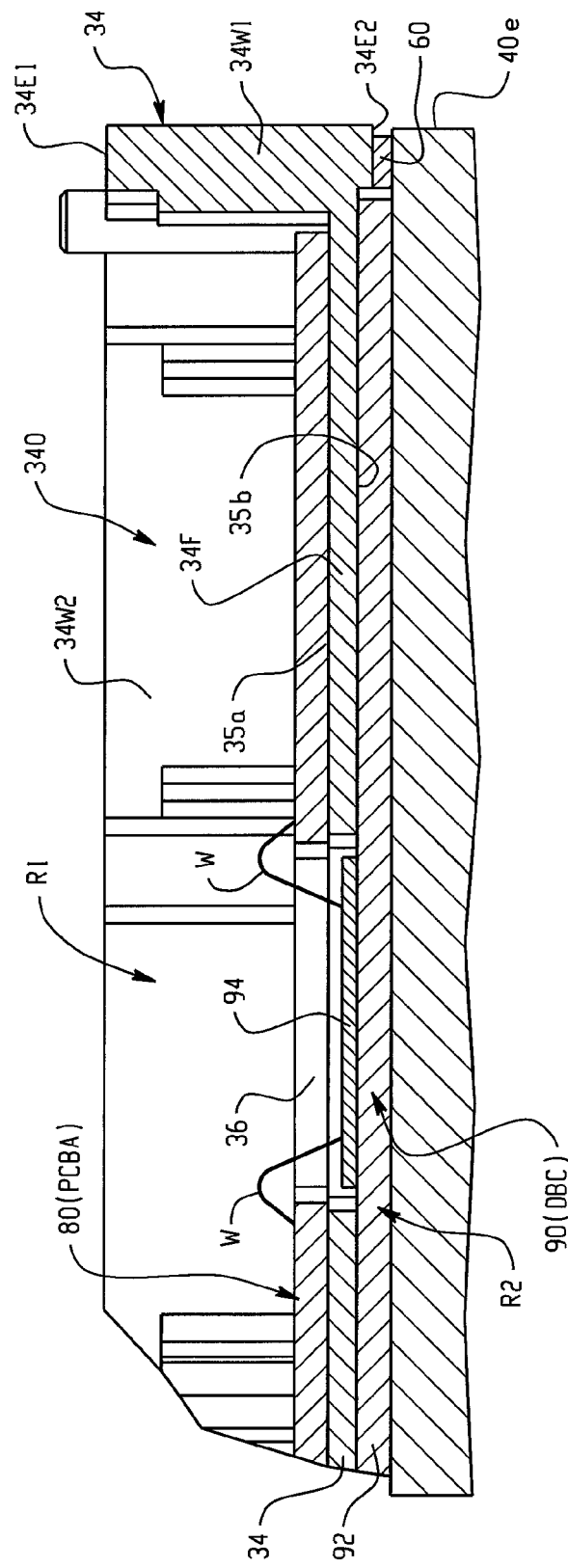
FIG. 5 is a partial section view taken at line 5-5 of FIG. 2.

FIGS. 4 and 5 illustrate the structure of the drive pod assembly 30 and its connection to the motor housing flange 40 in order to provide the noted level of environmental sealing. There, it can be seen that the drive pod assembly 30 comprises an upper housing 31 on which the connectors 32 and other connectors, indicators, switches, and the like are installed. The drive pod assembly 30 further comprises a frame 34 comprising a one-piece metallic structure defined from die-cast aluminum or other thermally conductive metal. The frame comprises a peripheral wall 34W that surrounds and defines a central recess or opening 34O. As shown, the peripheral wall 34W comprises four segments 34W1,34W2,34W3, 34W4 arranged in a generally rectangular structure.

The peripheral wall 34W comprises an upper edge 34E1 that is oriented away from the motor housing 22 and with which the upper housing 31 is abutted. The peripheral wall 34W also comprises a lower edge 34E2 oriented toward the motor housing 22, and this lower edge 34E2 defines the drive pod sealing surface 38 that mates with the motor housing sealing surface 42 with the seal 60 located between the sealing surfaces 42,38 as also shown in the section view of FIG. 5.

The frame 34 also comprises a floor 34F that extends across and spans the opening 34O so as to interconnect the wall segments 34W1-34W4 to each other. The floor 34F includes a first or upper side 35a, and an opposite second or lower side 35b. The floor 34F thus divides the central opening 34O of the frame 34 into an upper recess R1 located adjacent the upper side 35a of the floor, and a lower recess R2 located adjacent the lower side 35b of the floor. The floor 34F includes or defines one or more windows 36 that open therethrough between the first and second sides 35a,35b. The floor 34F adds a great deal of structural rigidity to the frame 34 which is desired in order to ensure that the lower edge 34E2 of the peripheral wall 34W of the frame 34 is sufficiently rigid and undistorted to properly engage the seal 60 and mate with the sealing surface 42 of the motor body flange 40.

The drive pod assembly 30 comprises a power supply PCBA (printed circuit board assembly) 80 that is connected to the frame 34 and electrically connected to the connectors 32. In particular, as shown in FIG. 5, the PCBA 80 is installed in the frame opening 34O and in abutment with a first or upper surface 35a of the floor. In one example, the PCBA 80 is glued or otherwise adhered to the first surface 35a of the floor 34F. The PCBA 80 is typically encased in a silicone or other potting or sealing material that at least partially fills the frame opening 34O on the first side 35a of the floor 34F above and around the PCBA 80. An upper housing IP sealing gasket or seal 33 is required and included within the design and depiction of the interface between upper housing 31 and upper edge 34E1 of the frame 34 to provide at least IP66 ingress protection for this interface.

A switching chip set assembly (DBC) 90 includes a base plate 92 and a plurality of IGBT or other switches 94 connected to the base plate 92. The base plate 92 is constructed from a nickel plated copper slug or other metal structure and provides a heat sink for the switches 94. The DBC 90 is installed in the frame opening 34O in abutment with the second or underside 35b of the floor 34F. In one example, the base plate 92 is glued, soldered or otherwise adhered to the second side 35b of the floor 34F. As shown in FIG. 5, the base plate 92 is abutted with the second side 35b of the floor 34F (directly or using an intermediate thermally conductive material) and the switches 94 are aligned or registered with one of the windows 36 defined in the floor 34F of the frame 34. One or more bond wires W or other electrical conductors are electrically connected between the PCBA 80 and the DBC 90 and pass through the window 36 with which the switches 94 are aligned or another window 36 to provide the required electrical connection between the PCBA 80 and the DBC 90 which are located on opposite sides of the floor 34F. As such, the base plate 92 is thermally connected or associated to the floor 34F at a first thermal interface. Likewise, as described above, the base plate 92 is thermally connected or associated to the mounting flange 40 of the motor housing 22 at a second thermal interface. As shown in FIG. 5, the floor 34F of the metal frame 34 lies between the PCBA 80 and the base plate 92 of the DBC 90. Furthermore, the DBC base plate 92 is in direct contact (or indirect contact through the heat transfer material 70) with the flange 40 of the motor body 22 with the optional thermal transfer material 70 located between the base plate 92 and the flange 40 to enhance thermal conductivity from the base plate 92 to the flange 40.

Unlike known IDM assemblies, the IDM assembly 16 uses the heat conductive metal floor 34F of the frame 34 to physically separate the PCBA 80 from the base plate 92 of the DBC 90 as best seen in FIG. 5. As such heat from the switches 94 of the DBC is conducted into the base plate 92, and this heat in the base plate 92 is conducted into the flange 40 of the motor body 22 and also into the floor 34F of the frame 34. Heat conducted into the motor body flange 40 is conducted throughout the motor body 22 where it is dissipated into the ambient air. Likewise, heat conducted from the DBC base plate 92 into the floor 34F is conducted from the floor 34F into the peripheral wall 34W of the frame 34 where it is dissipated into the ambient air. Some heat is conducted from the floor 34F into the PCBA 80, but it is much less than known IDM assemblies that do not include the metal frame 34 with the floor 34F. As such, both the PCBA 80 and the DBC 90 stay cooler as compared to known designs which improves the performance of the IDM assembly 16 and the overall IDM system 10.

The gasket seal 60 is located adjacent and extends continuously around the peripheral edge 40e of the motor body flange 40 in contact with the flange sealing surface 42. Likewise, the seal 60 is continuous contact with the entire lower edge 34E2 of the frame peripheral wall 34W. A plurality of bolts B are installed through the drive pod upper housing 31, through the frame 34, and are threaded into tapped bores defined the motor body 22 or are otherwise secured to the motor body 22 in order to clamp the seal 60 between the frame lower edge 34E2 and the flange surface 42 to complete the required IP seal. The metal frame 34 provides for advantageous structural integrity as compared to a plastic frame, which is required to maintain the minimum desired IP seal over time. Also, the metal frame 34 will not warp or otherwise become distorted over time, which could also cause the seal 60 to be rendered ineffective. Because the seal 60 is located adjacent the flange peripheral edge 40e and is coextensive with the lower edge 34E2 of the frame 34, the first and second thermal interfaces and all other thermal interfaces defined between the DBC 90 and the flange 40 and/or the floor 34F are contained within the seal opening 62, i.e., within the sealed area or zone defined between the floor 34F and the flange 40 and within the peripheral wall 34W of the frame 34 so as to be protected from environmental contaminants in order to prevent degradation of these thermal interfaces over time.

Known systems use a plastic frame to surround and contain the switching chip set assembly (DBC) and the power supply printed circuit board assembly (PCBA). The known plastic frame lacks a floor that physically separates the DBC from the PCBA to inhibit conduction of heat from the DBC into the PCBA and that also conducts heat outward into the peripheral wall of the frame. As such, the plastic frame of the known systems does not effectively conduct heat away from the base plate of the switching chip assembly DBC.

The exemplary embodiment has been described with reference to the preferred embodiments. Modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An integrated drive motor assembly comprising:
   a motor comprising a motor housing and a motor unit located in the motor housing, said motor housing comprising a mounting flange including a sealing surface and a peripheral edge;
   an electronics drive module connected to said mounting flange of said motor housing, said electronics drive module comprising: (i) a metal frame comprising a peripheral wall that defines a central opening and that includes an upper edge and a lower edge; (ii) a metal floor connected to said peripheral wall and extending across said central opening, said floor comprising an upper surface and a lower surface;
   a power supply PCBA located adjacent said upper surface of said floor;
   a switching chip assembly located adjacent said lower surface of said floor, said switching chip assembly comprising a base plate and a plurality of switches connected to said base plate, wherein said base plate is thermally associated at a first thermal interface to said lower surface of said floor and conducts heat into said floor and is thermally associated at a second thermal interface to said mounting flange of said motor housing and conducts heat into said mounting flange, wherein heat conducted to said floor by said base plate is conducted to said peripheral wall of said frame and heat conducted to said mounting flange from said base plate is conducted to said motor housing;
   wherein said lower edge of said metal frame is sealingly engaged with said sealing surface of said motor housing mounting flange, said integrated drive motor assembly comprising an environmental seal located between said lower edge of said frame and said sealing surface of said mounting flange and extending coextensively with said lower edge of said peripheral wall of said frame such that a sealed zone is defined within said peripheral wall of said frame and said first and second thermal interfaces are located within said sealed zone.

2. The integrated drive motor assembly as set forth in claim 1, wherein said environmental seal provides at least an IP66 level of ingress protection for said sealing zone.

3. The integrated drive motor assembly as set forth in claim 2, wherein said seal comprises an elastomeric seal that is located adjacent said peripheral edge of said mounting flange of said motor housing.

4. The integrated drive motor assembly as set forth in claim 1, wherein said floor comprises at least one window that opens through said upper and lower surfaces, and wherein said plurality of switches of said switching chip assembly are electrically connected to said power supply PCBA by an electrical connection that passes through said window.

5. The integrated drive motor assembly as set forth in claim 4, wherein said frame comprises a one-piece structure.

6. The integrated drive motor assembly as set forth in claim 5, wherein said one-piece structure comprises a die-cast metal structure.

7. The integrated drive motor assembly as set forth in claim 5, wherein said motor housing mounting flange comprises a metal structure and said frame of said electronics drive module is connected to said mounting flange by a plurality of fasteners such that said metal frame and said metal mounting flange clamp said environmental seal between said metal frame and said metal mounting flange.

8. The integrated drive motor assembly as set forth in claim 7, wherein said electronics drive module further comprises an upper housing that is abutted with said upper edge of said frame, and wherein said plurality of fasteners extend through said upper housing and said frame so as to fixedly secure said upper housing to said frame and fixedly secure said frame to said mounting flange.

9. The integrated drive motor assembly as set forth in claim 8, further comprising an upper housing seal located between said upper housing and said upper edge of said frame, said upper housing seal providing at least IP66 ingress protection.

10. The integrated drive motor assembly as set forth in claim 8, wherein said upper housing comprises at least one electrical connector electrically connected to said power supply PCBA.

11. The integrated drive motor assembly as set forth in claim 10, wherein said motor unit comprises a servo motor and said electronics drive module comprises a servo drive in which said plurality of switches of said switching chip assembly comprise IGBT switches.

12. A method for cooling an integrated motor drive assembly, said method comprising:
  connecting an electronics drive module to a metallic mounting flange of a metallic motor housing, said electronics drive module comprising: (i) a metal frame comprising a peripheral wall that defines a central opening and that includes an upper edge and a lower edge; (ii) a metal floor connected to said peripheral wall and extending across said central opening, said floor comprising an upper surface and a lower surface;
  conducting heat through a first thermal interface into said floor of said frame from a base plate of a switching chip assembly located adjacent said lower surface of said floor and conducting heat from said base plate through a second thermal interface into said mounting flange of said motor housing, wherein heat conducted to said floor by said base plate is conducted to said peripheral wall of said frame and heat conducted to said mounting flange from said base plate is conducted to said motor housing;
  providing at least IP66 level ingress protection for said first and second thermal interfaces by including a seal between said lower edge of said metal frame and a sealing surface of said mounting flange such that a sealed zone is defined within said peripheral wall of said frame between said mounting flange and said floor.

\* \* \* \* \*